United States Patent [19]
McKinney

[11] 3,724,667
[45] Apr. 3, 1973

[54] ACTIVATED SLUDGE PROCESS AND SYSTEM

[75] Inventor: Ross E. McKinney, Lawrence, Kans.

[73] Assignee: Air Products & Chemicals, Inc., Allentown, Pa.

[22] Filed: Oct. 28, 1971

[21] Appl. No.: 193,604

Related U.S. Application Data

[63] Continuation of Ser. No. 42,271, June 1, 1970, abandoned.

[52] U.S. Cl. .................210/195, 210/7, 210/14, 210/197, 210/219, 261/91
[51] Int. Cl. ...............................................C02c 1/10
[58] Field of Search ....................210/3–9, 14, 15, 210/195, 194, 220, 221

[56] References Cited

UNITED STATES PATENTS

| | | |
|---|---|---|
| 3,547,813 | 12/1970 | Robinson et al.....................210/15 |
| 3,341,450 | 9/1967 | Ciabattari et al.....................210/15 X |
| 3,219,575 | 11/1965 | Chapman et al.....................210/12 X |
| 3,369,343 | 2/1968 | Robb.....................55/68 X |

Primary Examiner—Michael Rogers
Attorney—Ronald B. Sherer

[57] ABSTRACT

An activated sludge sewage treatment process and system: the process and system include an enclosed aeration chamber providing a vessel for a mixed liquor formed from a liquid biologically degradable waste and recirculated sludge, with an upper region in the enclosed chamber into which droplets of the mixed liquor are generated and a gas containing a major portion of oxygen is injected under pressure. The gas in the upper region is maintained under pressure and oxygen is transferred to the droplets and mixed liquor at an improved rate.

5 Claims, 1 Drawing Figure

PATENTED APR 3 1973 3,724,667
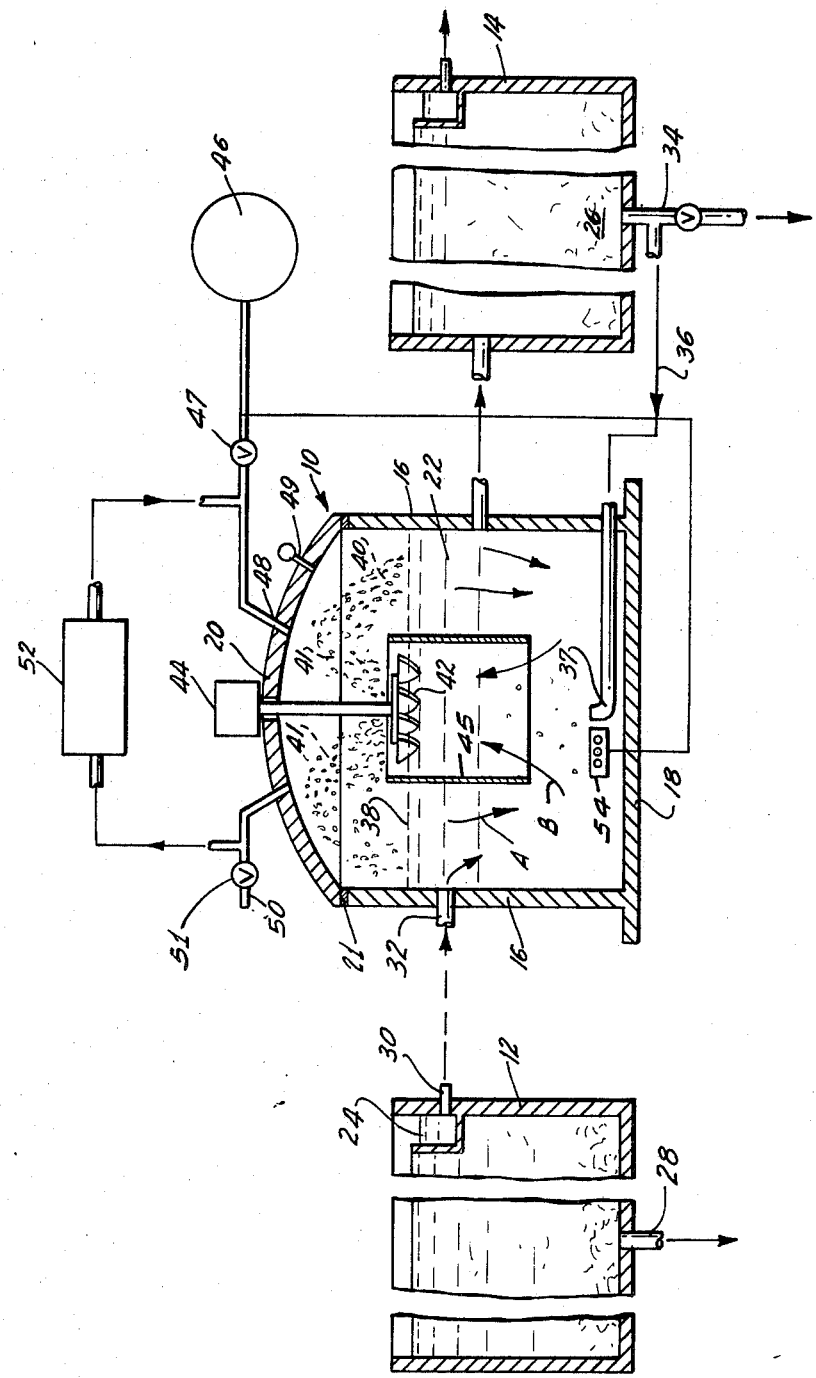
INVENTOR
ROSS E. MCKINNEY
BY
Curtis, Morris & Safford
ATTORNEYS

ACTIVATED SLUDGE PROCESS AND SYSTEM

This application is a continuation of Ser. No. 42,271, filed June 1, 1970, now abandoned.

BACKGROUND OF THE INVENTION

This invention relates to an activated sludge sewage treatment process and system and, more particularly, to a process and system which utilizes an enclosed aeration chamber into which is injected an oxygen enriched gas which contacts the mixed liquor being aerated.

It is well established that domestic sewage, as well as waste from commercial and chemical operations which create a biologically degradable material, must be treated before being discharged into a receiving body or stream of water. Various processes and systems have been proposed for treating such waste. One of the most popular processes is the activated sludge process.

In the activated sludge process, the waste to be treated is aerated in the presence of bacteria until the bacteria have stabilized the organic matter in the waste. The bacteria, while stabilizing the organic matter, require a supply of dissolved oxygen in order to function in an aerobic state. In addition to the bacteria, which are microscopic plants, microscopic animals, particularly protozoa, must be present in the system to remove excess bacteria from the sludge.

The ecology of the system may be traced from the organic nutrients of the waste which is fed into the system and serves as food for the bacteria and to the protozoa which live off the bacteria which utilize the organic matter. Both the bacteria and the protozoa or other microscopic animals require oxygen so that the system will be in an aerobic condition and function efficiently, not generating odors and creating other unwanted effects which result from an anaerobic system.

With activated sludge it is necessary to aerate the sludge so that oxygen may be transferred from the air to the liquid in the sludge. This dissolved oxygen serves as a supply for the bacteria and the protozoa.

In the normal operations, most waste contains sufficient microorganisms to produce an activated sludge without seeding bacteria. However, in an activated sludge treatment process or system, the time to produce sludge without seeding would be too long and uneconomical to be usable. Accordingly, in an activated sludge system, sludge is removed from a settling chamber and recirculated and aerated with the waste being added so that the recirculated sludge supplies the microorganisms necessary to stabilize the material.

In a conventional activated sludge system the waste material which is to be treated is usually first passed into a primary sedimentation tank or basin where the settleable solids are permitted to settle out. The remaining liquor is then transferred to an activated sludge aeration tank or chamber. If desired, the primary sedimentation tank may be eliminated although it is generally good practice in at least large installations to use a primary tank. The effluent from the primary tank is then fed to the activated sludge aeration chamber where the waste liquid is mixed with sludge containing the necessary microorganisms and which has resulted from earlier treated waste. This forms a mixed liquor which is aerated for a predetermined period of time in the aeration tank.

The aeration is usually accomplished by means of diffusing air into the mixed liquor so that it bubbles upwardly through the liquor or by mechanically stirring or agitating the liquor within the tank so as to contact the oxygen in the air. These aeration methods are directed towards increasing the amount of dissolved oxygen in the liquor.

The amount of oxygen in the liquor is of importance since oxygen is one of the primary limiting factors influencing the efficiency of a conventional activated sludge system. The demand of oxygen is a direct function of the biological metabolism in the system. The greatest demand for oxygen may be expected to occur at that portion of the aeration tank or chamber when the food (the form of waste) and the microorganisms are mixed together. If the demand for oxygen is substantially greater than the supply, anerobic conditions will set in and problems will develop in operating the system.

Low dissolved oxygen concentrations result in a turbid effluent from the aeration chamber since the protozoa do not develop to their fullest extent and the desired ecology of the system is disturbed.

In order for an activated sludge process to function properly it is generally accepted that a dissolved oxygen residual of at least 0.5 mg. per liter should be present at all times. As pointed out heretofore, oxygen is usually supplied to activated sludge by either mechanical or diffused aeration methods. With all prior art diffused aeration methods, as far as it is known, there has been a low rate of oxygen transfer efficiency and this has been considered one of the major engineering problems with activated sludge systems.

In diffused aeration the oxygen in the air must be transferred from a bubble of gas to the liquid and then to the microorganism. Since oxygen is a fairly insoluble gas, there is an obvious resultant low efficiency of transfer. The rate of oxygen transfer is a function of the oxygen gradient existing between the gas and the liquid, the surface area of contact between the liquid and the gas, the time of contact, temperature, and the characteristics of the liquid. Adding to the problems of oxygen transfer when air is used is the fact that only approximately 21 percent of air is oxygen. Accordingly, the contact between the oxygen in the air and the liquid is further reduced.

In order to overcome this shortcoming of the precentage of oxygen in air, it has been suggested that substantially pure oxygen be utilized and diffused in an activated sludge system rather than air.

Generally speaking, with diffusion methods, small bubbles of air or oxygen transfer more oxygen than large bubbles. However, while the bubbles of gas may be small when generated they have a tendency to coalesce as they rise through the liquid. Therefore, the larger resulting bubbles are spaced apart greater distances than would be the case with smaller bubbles. As the large bubbles rise in the liquid, the region about it forms a cloud of oxygen saturated liquid which is carried along by the bubble. As a result, the oxygen trapped in the bubble cannot be transferred to the liquid beyond the cloud.

With the mechanical aeration methods the surface is agitated or droplets of liquor are showered down over the tank surface permitting the agitated surface or droplets to be exposed to the oxygen in the air. The transfer of oxygen to droplets is more rapid than the transfer of oxygen from bubbles of air, because the interfacial film is about as third as thick with droplets. However, it is obvious that the attainable time of exposure of droplets to air in an open tank or chamber is usually quite short. For this reason, in ordinary activated sludge systems, it would be uneconomical to use an oxygen rich gas in place of air since the overwhelming portion of it would be wasted if one tried to create an oxygen rich atmosphere in the region above the liquor in an aeration chamber and to shower droplets through it.

In addition to the problem of oxygen transfer, one of the shortcomings of the conventional activated sludge process is its lack of stability. While theoretically simple, the activated sludge process is difficult to operate, particularly in those cases where the sewage flow or organic loading of the influent varies. Of course, if the load or flow can be retained and fed into the system at a uniform rate, then operations become more constant and more susceptible to control. However, in those situations where the load varies, operating problems are very likely to be encountered.

Generally when microorganisms reach the end of the aeration period, they are in equilibrium with the organic matter surrounding them. The number of living organisms at that time is directly proportional to the organic matter available at this point and a balance is maintained between the bacteria and the microscopic animals. In a normal cycle of domestic sewage treatment, for example, the flow and the organic strength are very low at night and increase during the day. This means that the microorganisms will increase during the period of heavy flow or food supply and then as the availability of nutrient organic matter is reduced, the microbial mass will also decrease along with the rate of metabolism. If this occurs, the microorganisms may be lost in the effluent from the aeration tank or chamber. When a new load is introduced the microbial mass must be built up again. This imbalance and oscillation has caused substantial trouble in the operation of activated sludge systems. To overcome this, it has been proposed to provide a relatively constant system with a proper balance between the available food or nutrient supply and the microorganism population. To do this a variation on the activated sludge system called the complete mixing or completely mixed activated sludge process has been devised. This system is rapidly becoming very popular and is usable in plants of varying size from the small package plants used for small industrial wastes to disposal systems for large municipalities.

In the complete mixing activated sludge system, the influent waste is mixed with the mixed liquor under aeration and the recirculated sludge so that there will be a substantially uniform MLSS concentration, BOD and COD in the aeration tank.

While the complete mixing activated sludge system gives a substantially constant microorganism population and food supply throughout the aeration tank, it is necessary that an adequate and economical supply of oxygen also be provided within the mixed liquor to insure the proper microorganism growth and activity.

SUMMARY OF THE INVENTION

Therefore, it is an object of the present invention to provide an improved activated sludge process and system having good oxygen transfer rate and efficiency and one which is particularly suited for use in a complete mixing activated sludge process and system.

According to the present invention, in an activated sludge sewage treatment process and system a closed aeration chamber is provided into which an oxygen rich gas is injected under pressure. As pointed out heretofore, the efficiency of oxygen transfer is greater with aerated droplets than with bubbles of gas which are diffused through the mixed liquor. Accordingly, the improved transfer also includes the generation of droplets in the enclosed area or region into which the oxygen rich gas is injected. The gas is advantageously injected under a pressure greater than atmospheric and the gas in that upper region is also maintained at a pressure greater than atmospheric. It is believed that the combination of an oxygen rich gas and the increased pressure increases the efficiency of the oxygen transfer to the droplets of liquor generated in the enclosure.

BRIEF DESCRIPTION OF THE DRAWING

The FIGURE is a schematic and diagrammatic sectional side view showing an activated sludge system in accordance with the present invention.

DESCRIPTION OF THE PRESENT INVENTION

Referring to the drawing an aeration chamber 10 is shown which is connected to a primary sedimentation tank 12 and to a secondary sedimentation tank 14 to provide a basic activated sludge treatment system.

The operation of the activated sludge system is well known to those skilled in the art. The waste to be treated is first placed in the primary sedimentation tank 12 and maintained there for a sufficient detention time to permit settleable solids to settle and the effluent is then passed to the aeration chamber 10 where it is aerated and mixed with the liquor in the chamber. The waste to be treated is also mixed in the chamber with sludge which is recirculated from the secondary sedimentation tank 14. It is the sludge from the secondary tank which provides the seed microorganisms to build up the activated sludge in the aeration chamber 10.

In the illustrated embodiment, the aeration chamber 10 has side walls 16, a bottom wall 18 and a top wall 20. Sealing means 21 are provided between the top and side walls in order to seal chamber 10 and thereby maintain the above-described superatmospheric pressure in the enclosed chamber. For illustration purposes, the aeration chamber 10 may be considered to be square although it is to be understood that it may be of any other suitable configuration such as circular or rectangular.

The mixed liquor 22 in the aeration chamber includes the influent waste 24 from the primary tank 12 and sludge 26 which has been recirculated from the secondary tank 14. The waste 24 is substantially free of settleable solids which have been removed in the primary tank 12. These settleable wastes may be removed from the tank 12 by any suitable means such as a bottom outlet 28.

The influent 24 flows through a waste outlet 30 in tank 12 to an inlet 32 in the aeration chamber 10. In the secondary tank 14, which contains the aerated and settled sludge 26, is an outlet 34 which is connected to a recirculation line 36. The recirculation line 36 is connected to the aeration chamber and a dispersion outlet 37 in the chamber.

The means and method of returning the sludge and the mixing of it with the liquor in the tank and the added waste are well known to those skilled in the art.

Above the upper level 38 of the liquor 22 is a gas space forming the upper region 40 of the aeration chamber 10. In the illustrated embodiment mounted near the liquid level 38 is an apparatus 42 for generating a spray or cloud of droplets 41 of the mixed liquor in the upper region 40. As mentioned heretofore, the transfer of oxygen to droplets id more rapid than the transfer of oxygen from bubbles of air in the mixed liquor.

The droplet apparatus may be driven by any suitable means such as a motor 44 which may be mounted on the outer surface of the top wall 20, and preferably includes a draft tube 45 for promoting the recirculation pattern of the mixed liquor as illustrated by arrows A and B.

In order to provide oxygen for the transfer to the droplets a supply tank 46 of oxygen rich gas is maintained and connected by a suitable inlet 48 and valve 47 to the upper region 40. The gas should have a sufficient oxygen content to maintain at least an atmosphere of more than 50 percent oxygen and preferably at least 80 percent so that a major portion of the atmosphere in region 40 is oxygen.

Since the upper region 40 is completely enclosed, the oxygen rich gas entering through the inlet 48 cannot escape to the atmosphere, except through vent 50 as hereinafter described, and is, therefore, continually available to provide a rich oxygen atmosphere for the droplets which are generated from the liquor. As a result the liquor is constantly being furnished with an abundant oxygen supply. Preferably the pressure in the upper region 40 is in excess of atmospheric pressure and desirably in the range of greater than one atmosphere to about ten atmospheres. Also, the pressure of the entering oxygen rich gas is of the same order of pressure. If desired a pressure gauge 49 may be provided to monitor the pressure in region 40. Additional aeration gas may also be supplied through a conventional air-type diffuser 54 which may be connected to any source of aeration gas such as, for example, supply tank 46.

In the aeration of the sludge during the period it is detained in the chamber 10, some gases will be generated which are preferably withdrawn from the chamber. To remove such gases a vent 50 including a valve 51 is provided and periodically the gaseous atmosphere should be vented.

The use of a droplet generator 42 in the oxygen rich atmosphere of the outer region 40 provides a high rate of oxygen transfer in the activated sludge system, thus giving improved efficiency to the production of microorganisms and, hence, reducing the retention time required for sludge in the aeration chamber.

In addition to venting the gas from the upper region through the vent 50 as required, an absorber 52 is advantageously arranged in parallel with the aeration chamber 10 and connected by means of suitable piping no that undesirable gases, for example, carbon dioxide, may be removed as the gas is recirculated.

Air normally contains about 21 percent oxygen by volume. Accordingly, in an aeration system using droplets, where air is used as the source of oxygen, the partial pressure exerted by the oxygen on the droplets is approximately 21 percent of the total pressure. However, if an oxygen rich atmosphere is created, for example one containing 84 percent oxygen, the partial pressure exerted by the oxygen will be 84 percent. Inasmuch as the driving force exerted by the oxygen is a factor in the transfer of oxygen to the droplets of liquor, droplets exposed to an 84 percent oxygen atmosphere will have approximately four times the oxygen when saturated compared to droplets in an air atmosphere.

The oxygen content of the gas will vary depending upon the amount of carbon dioxide or other gases generated in the aeration tank and the quality of the gas supplied. Commercially available oxygen gas is normally at least 99 percent pure and in some cases it may be desirable to use a gas supply of this content. In other cases a lesser oxygen content will be acceptable. In all cases a major portion of the gas should be oxygen and preferably of the order of at least 80 percent.

In most cases venting of a small volume of gas and the utilization of an absorber to remove carbon dioxide from recirculated gas from the upper region will be satisfactory for maintaining an 80 percent oxygen level.

To show the improved effect of an oxygen rich atmosphere in a pressurized system, a pilot plant was established. The pilot plant consisted of an enclosed aeration chamber into which was injected substantially pure oxygen under a pressure in excess of one atmosphere. A second enclosed aeration chamber was established with air injected into the closed chamber also under a similar pressure in excess of one atmosphere. As a control unit a third aeration chamber was provided which was open to the air and it relied solely upon ambient air for its supply of oxygen. Into each chamber one liter per day of settled domestic sewage was fed for two hour aeration periods. The sludge recirculation rate was set at a 100 percent return rate. The air flow and the oxygen flow of enclosed chambers 1 and 2 were set to give a steady gas flow at about two inches of water pressure.

In order to give an indication of the effect of oxygen and pressure on the development of a sludge, all units were initially started with only bacterial growth. The oxygen unit was the first to show the presence of animal growth in the form of protozoa. The air pressure unit required almost three weeks to show any protozoa or growth. At the end of three weeks the open air unit did not show any protozoa growth.

After a good sludge had been developed and placed in all three units tests were run to determine the results of the oxygen pressure chamber, the air under pressure chamber, and the open air control chamber. An aeration time of two hours was used and the results are set forth in Table I.

Key To Table I

SF—Sewage Flow—liters/day
AT—Aeration Time—hours

TOT BOD—Total BOD—Milligrams/liter
SOL BOD—Soluble BOD—Milligrams/liter
TOT COD—Total COD—Milligrams/liter
SOL COD—Soluble COD—Milligrams/liter
TOT SS—Total Suspended Solids—Milligrams/liter
FIX SS—Fixed Suspended Solids—Milligrams/liter
VOL SS—Volatile Suspended Solids—Milligrams/liter As can be seen from the results of Table I the utilization of a pressure system above atmospheric resulted in improved activity and particularly in regard to the BOD and COD. The oxygen unit (1) showed an extremely good BOD improvement over the open air unit (3) and the air under pressure unit (2). The improved efficiency of the oxygen unit is the result of the availability of an oxygen rich atmosphere, for the reasons as set forth hereinbefore.

What is claimed is:

1. An activated sludge aeration system including:
   a. means forming an enclosed aeration chamber,
   b. inlet means introducing oxygen-rich aeration gas comprising more than 50 percent oxygen into said enclosed aeration chamber,
   c. inlet means introducing biologically degradable liquid waste and recycled sludge into said enclosed aeration chamber to form a mixed liquor therein,
   d. aerator means recirculating and aerating said mixed liquor in contact with said oxygen-rich aeration gas whereby oxygen is dissolved into said mixed liquor and at least one other gas is given off by said mixed liquor thereby diluting the oxygen content of the oxygen-rich aeration gas above the mixed liquor,
   e. vent means connected to said enclosed aeration chamber for venting a portion of the oxygen-rich aeration gas diluted with said other gas from said enclosed aeration chamber to atmosphere,
   f. recycle conduit means having an inlet end in fluid communication with the upper portion of said enclosed chamber at a first location and a discharge end in fluid communication with the upper portion of said enclosed chamber at a second location for recycling some of said diluted oxygen-rich aeration gas from a first upper portion of said enclosed aeration chamber to a second upper portion of said enclosed chamber,
   g. adsorber means connected to said recycle conduit means intermediate said first and second upper chamber portions for removing a substantial amount of said other gas from the recycled oxygen-rich aeration gas and substantially increasing the oxygen content of the recycled oxygen-rich aeration gas returned to said enclosed aeration chamber, and
   h. valve means for controlling the proportion of diluted aeration gas which is vented to atmosphere versus that which is recycled through said adsorber.

2. The activated sludge system as claimed in claim 1 wherein said other gas is carbon dioxide at least a substantial portion of which is removed by said adsorber means whereby the oxygen content of the aeration gas returned to said enclosed chamber is substantially greater than that of the vented gas.

3. The activated sludge aeration system as claimed in claim 1 wherein said inlet end of said recycle conduit

TABLE I

| Unit | SF | AT | Influent | | | | | | | | | | Mixed liquor | | | | | | Effluent | | | | | | | | | |
|---|---|---|---|---|---|---|---|---|---|---|---|---|---|---|---|---|---|---|---|---|---|---|---|---|---|---|---|---|
| | | | TOT BOD | SOL BOD | TOT COD | SOL COD | TOT SS | FIX SS | VOL SS | Percent VSS | pH | Temp, °C | TOT SS | FIX SS | VOL SS | Percent VSS | pH | Temp, °C | TOT BOD | SOL BOD | TOT COD | SOL COD | TOT SS | FIX SS | VOL SS | Percent VSS | pH | Temp, °C |
| 1 | 24 | 2 | 190 | 123 | 238 | 174 | 56 | 2 | 54 | 96 | 6.9 | 23 | 1,292 | 168 | 1,124 | 81 | 7.0 | 24 | 28 | 5 | 50 | 22 | 28 | 2 | 26 | 93 | 7.3 | 25 |
| 2 | 24 | 3 | 190 | 126 | 280 | 142 | 74 | 12 | 62 | 84 | 6.6 | 22 | 120 | 8 | 112 | 93 | 7.5 | 26 | 92 | 60 | 160 | 106 | 54 | 4 | 50 | 93 | 7.2 | 25 |
| 3 | 24 | 2 | 189 | 130 | 224 | 160 | 68 | 6 | 62 | 92 | 7.0 | 22 | 308 | 36 | 274 | 85 | 7.5 | 25 | 89 | 16 | 184 | 40 | 116 | 12 | 104 | 90 | 7.3 | 25 | means is connected to said atmospheric vent means, and said discharge end is connected to said oxygen-rich aeration gas inlet means, and wherein said valve means are positioned in said vent means for controlling the amount of diluted oxygen-rich aeration gas which is vented to atmosphere versus that recycled through said adsorber.

4. An activated sludge aeration system including a completely enclosed aeration chamber comprising:
   a. a structure having bottom, side and top walls,
   b. seal means between said walls for maintaining a superatmospheric pressure in said enclosed aeration chamber,
   c. inlet means introducing biologically degradable waste liquid and recirculated sludge into said enclosed aeration chamber,
   d. means for completely mixing said waste liquid and said recirculated sludge to form a mixed liquor having a substantially uniform MLSS concentration,
   e. a source of oxygen-rich aeration gas containing at least 50 percent oxygen under a superatmospheric pressure greater than one atmosphere,
   f. conduit means connected between said source of superatmospheric oxygen-rich aeration gas and said enclosed aeration chamber through which said superatmospheric oxygen-rich aeration gas is supplied to said enclosed aeration chamber,
   g. valve means in said conduit means maintaining the flowrate of said superatmospheric oxygen-rich aeration gas at a rate sufficient to maintain the pressure of said oxygen-rich aeration gas in said enclosed chamber above the level of said mixed liquor at a superatmospheric pressure but less than 10 atmospheres,
   h. said means for completely mixing said waste liquid and said recirculated sludge including bladed surface aerator means projecting a spray of droplets of said mixed liquor into the upper region of said enclosed chamber in contact with said superatmospheric oxygen-rich aeration gas for transferring oxygen to said mixed liquor and,
   i. outlet means for removing oxygenated mixed liquor from said aeration chamber at substantially uniform MLSS concentration.

5. An activated sludge aeration chamber for rapidly oxygenating biologically degradable waste liquid with a substantially uniform MLSS concentration throughout said aeration chamber including:
   a. bottom, side and top walls forming an enclosed aeration chamber,
   b. inlet means introducing biologically degradable waste liquid and activated sludge into said enclosed chamber to form a mixed liquor,
   c. a source of oxygen-rich aeration gas comprising more than 50 percent oxygen under superatmospheric pressure,
   d. conduit means connected between said source of superatmospheric oxygen-rich aeration gas and said enclosed aeration chamber through which said superatmospheric oxygen-rich aeration gas is supplied to said enclosed aeration chamber,
   e. valve means in said conduit means maintaining the flowrate of said superatmospheric oxygen-rich aeration gas at a rate sufficient to maintain the pressure of said oxygen-rich aeration gas in said enclosed chamber above the level of said mixed liquor at a superatmospheric pressure but less than 10 atmospheres,
   f. bladed surface aerator means positioned at the surface of said mixed liquor for recirculating said mixed liquor and projecting portions thereof into oxygen transfer contact with said superatmospheric oxygen-rich aeration gas above the level of said mixed liquor,
   g. second conduit means connected to said source of superatmospheric oxygen-rich aeration gas and extending to the lower portion of said enclosed chamber substantially below the level of said mixed liquor, and
   h. a submerged diffuser connected to said second conduit means and positioned in the bottom portion of said chamber in the region vertically below said surface aerator means for oxygenating said mixed liquor with superatmospheric oxygen-rich aeration gas in the lower liquid portion of said chamber and producing upward flow of oxygenated mixed liquor toward said surface aerator means whereby said surface aerator means and said submerged diffuser combine to produce rapid recirculation of the mixed liquor and substantially uniform MLSS concentration of said mixed liquor throughout said chamber.

* * * * *